United States Patent [19]

Carver et al.

[11] 4,381,718
[45] May 3, 1983

[54] LOW EMISSIONS PROCESS AND BURNER

[76] Inventors: George P. Carver, 26 Linda Isle, Newport Beach, Calif. 92660; Michael P. Heap, 1 Banyon Tree La., Irvine, Calif. 92715; G. Blair Martin, 1124 Askham Dr., Cary, N.C. 27511; David W. Pershing, 1582 Tomahawk Dr., Salt Lake City, Utah 84103; Dee P. Rees, 8 Bitterwood, Irvine, Calif. 92714; Dennis M. Zallen, 14216 Turner Ct., Albuquerque, N. Mex. 87123

[21] Appl. No.: 207,208

[22] Filed: Nov. 17, 1980

[51] Int. Cl.³ ............................................. F23D 1/00
[52] U.S. Cl. ................................... 110/347; 110/218; 110/342
[58] Field of Search ............... 110/263, 342, 343, 344, 110/345, 342, 218; 431/10

[56] References Cited

U.S. PATENT DOCUMENTS

| | | | |
|---|---|---|---|
| 3,124,086 | 3/1964 | Sage et al. | 110/347 X |
| 3,320,906 | 5/1967 | Domahidy | 110/342 |
| 3,625,164 | 12/1971 | Spector | 110/342 |
| 3,727,562 | 4/1973 | Bauer | 431/10 X |
| 3,788,796 | 1/1974 | Krippene et al. | 110/342 X |
| 4,185,080 | 1/1980 | Rechmeier | 110/343 X |
| 4,250,820 | 2/1981 | Lautenschlager | 110/347 |
| 4,297,093 | 10/1981 | Morimoto et al. | 431/10 |

FOREIGN PATENT DOCUMENTS

| | | | |
|---|---|---|---|
| 573991 | 4/1959 | Canada | 110/343 |
| 979308 | 12/1975 | Canada | 431/10 |

Primary Examiner—Edward G. Favors
Attorney, Agent, or Firm—George F. Bethel; Patience K. Bethel

[57] ABSTRACT

The following specification discloses a process and burner for combusting fossil fuels such as coal to provide low $SO_x$ and $NO_x$ emissions. The process includes pulverizing the coal together with an alkaline material, such as limestone in an amount calculated to provide an alkaline metal stoichiometric equivalent of one to seven times the stoichiometric equivalent of the sulphur contained in the coal. The resulting pulverized coal-limestone mix is then combusted under fuel rich conditions. For example, 25% of the theoretical air required to combust the coal is preheated and injected into the combustion zone together with the pulverized coal-limestone mixture. The primary or transport air is swirled to increase mixing and to stabilize the flame. Preheated secondary air is introduced to the combustion zone. The amount of the preheated secondary air amounts to approximately 40% to about 100% of the theoretically required air. Finally, the balance of the stoichiometric air required to combust the coal along with a 25% to 40% excess is added to the combustion zone.

10 Claims, 9 Drawing Figures

LOW EMISSIONS PROCESS AND BURNER

BACKGROUND OF THE INVENTION

Recent shortages in the production of oil have provided a revived interest for utilizing the large deposits of coal which are present in the United States. Coal has historically earned a bad reputation due to its highly polluting nature, not only from the standpoint of the ash which is produced, but also due to the production of $NO_x$ and $SO_x$ emissions from the sulphur and nitrogen contained within it. In order to alleviate and remove these polluting chemicals, efforts have been renewed in finding new processes and in designing burners which are capable of reducing the total amounts of pollutants which are produced. The environmental Protection Agency has also lowered the permissible amounts of the above mentioned pollutants which can be released to the atmosphere. It has thus been imperative to find new ways of combusting coal which will permit the reduction of the pollutants to the required levels.

During combustion, coal particles decompose to produce volatile fractions which include light gases, high molecular weight compounds, and solid materials referred to as char. Current methods of reducing nitrogen oxide emissions are generally directed toward creating conditions which favor the production of $N_2$. This is primarily achieved by limiting the amount of oxygen available to the coal or other fossil fuel in the initial stages of combustion. Initially, less than the stoichiometric amount of air required to combust the coal is introduced with the coal to create a fuel rich condition. Greater amounts of air are then added, usually in one or two more stages. In the last stage, the combustion conditions often include using an excess of the stoichiometric amount of air which is required for combustion.

As used herein and in the appended claims, the term "stoichiometric" is meant to define the exact amount of a substance which will react in a specific chemical reaction with no excess of reactant or product.

Various types of burners have been utilized for purposes of creating the staged air conditions. Examples of such burners include circular wall fired burners and tangential non-swirling interacting flame burners. These burners are distinguished by the conditions of the heat release zone. In circular wall fired burners the heat release zone is close to the burner, while in the tangential non-swirling interacting flame systems, the heat release zone is spaced from the burner. These burners can be used in conjunction with various types of furnaces, for example: wall fired, arch fired, corner fired, and slot fired furnaces.

Circular wall fired burners include a fuel injector, a combustion air distribution system, some device to provide tangential velocity to one or more air streams, an exit refractory cone, and ignition and safety systems. In general, circular coal burners are typically high turbulence burners which produce high heat release intensities which favor the production of high nitrogen oxide levels.

Several wall fired burners have been designed to produce lower nitrogen oxide emissions than the standard circular coal burners. These burners operate by supplying controlled amounts of air in stages to the combustion zone.

An example of such a burner is one produced by Babcock and Wilcox. The burner includes a venturi/plug combination which delivers a homogeneous mixture of coal and primary air through a primary tube. Surrounding the primary tube are dual annular secondary air registers. The inner secondary air register contains a swirl vane to vary air swirl and control coal to air mixing. This burner is often called a dual register burner.

Another example of a circular wall fired burner is a Foster Wheeler low turbulence burner. In this burner, the primary air-coal stream issues from a tapered annular coal nozzle which is provided with an axially movable inner sleeve. By such provision, the primary air stream velocity can be varied at constant air flow. Such a burner is often termed in the industry as a dual throat burner. Air to the tubular passages is monitored by means of a master air register which operates by means of a pressure drop across a perforated plate which surround the air register. The amount of air to each of the passages is controlled by means of air register vanes.

The Steinmueller circular wall fired burner is characterized by a primary air fuel injector which is surrounded by a single secondary air passage and four outboard staging air ports. Swirl in the secondary air passage is controlled by varying the position of an annular fixed angle swirl vane assembly which is adjusted relative to a conversion cone. The outboard air ports are provided with air dampers for purposes of controlling flow to these ports.

The Environmental Protection Agency has presently targeted 1985 as the year for establishment of new source performance standards which are equivalent to 20% of those which exist today. Thus, the above described coal fired burners, while sufficient to operate under today's emission standards, will be inadequate to fulfill the projected goals. Newly designed burners and techniques are therefore necessary to comply with the projected standards.

Since approximately 75% of the nitrogen oxides arise from nitrogen contained in the coal, the primary emphasis is on control of the fuel NO formation. The oxidation of molecular nitrogen often called thermal NO, has been found to be affected by flame temperatures and combustion product quench rate. By minimizing the peak flame temperatures and maximizing the combustion product quench rates, the thermal NO formation can be reduced.

The formation of fuel NO is influenced primarily by the conditions in the heat release zone. Primarily, efforts are directed to burning under fuel rich conditions. Variations of the burner design can be utilized to control peak flame temperatures, product quench rates, and residence time in fuel rich zones. These are a function of the method of fuel and air injection, the distribution of axial and tangential velocity, the burner geometry and the like.

At the same time that the nitrogen oxides are desirably kept at a minimum, it is equally desirable to minimize the production of sulphur oxides.

Various methods have been tried for removing sulphur oxides from exhaust gases resulting from coal combustion. These methods are primarily directed to pretreatment of the coal to remove sulphur prior to combustion. Other treatments include passage of the combustion gases through lime slurries and the like prior to releasing the gases to the atmosphere. Other studies have investigated the injection of dry limestone into the stack gases.

In recent years, many investigators have explored the possibility of using sorbents for in situ sulphur removal from coal during combustion. Such experimentation proved that in situ removal of $SO_2$ was feasible by means of the dry sorbents, but that the efficiency was not great enough to make the process economically attractive. Initial studies involved the injection of the dry sorbents into the combustion zone near the fuel injector. This was followed by monitoring the stack gases to establish $SO_2$ levels.

Further studies indicated that the adsorption of sulphur from the coal constituted a very complicated chemical reaction. The efficiency appeared to be dependent on the stoichiometric ratio of the alkaline metal in the sorbent to coal sulphur, the physical characteristics of the sorbent including particle size, the combustion time-temperature history of the sorbent particle, and the type of gaseous sulphur compounds which are formed, i.e. reduced or oxidized. The last two factors, including the time-temperature history and the type of gaseous sulphur species can be controlled in part by the burner design.

It has now been found according to the invention that the sulphur which is contained in coal during combustion can be captured by a process of calcining the sorbent during combustion. By this process, the amount, distribution, angle, and turbulence of air which is provided to the coal during combustion is controlled. Under these same process conditions, the $NO_x$ emissions can also be kept desirably low.

This invention is directed toward overcoming the deficiencies of the prior art by helping to decrease the $NO_x$ and $SO_x$ emissions through a combustion process utilizing a sorbent and controlled combustion conditions.

The process of the invention can be employed in conjunction with various burners and furnaces, which are capable of providing the process conditions. A burner which is preferred for use in the invention process is also provided herein.

FIELD OF THE INVENTION

This invention relates to the field of fossil fuel combustion and particularly to a system for combusting coal which utilizes a pulverized coal-limestone or analogous mixture. This mixture is combusted under controlled air conditions to provide fuel rich conditions and lower combustion temperatures than would be possible by adding all the theoretically required air to the combustion mixture.

SUMMARY OF THE INVENTION

The process according to the invention involves mixing a sulphur sorbent together with coal. The amount used is that which is calculated to give a stoichiometric ratio of metal in the sorbent to sulphur contained in the coal of at least one. The mixture is then pulverized into a small particle size, followed by combusting the mixture under conditions wherein the air is swirled to effect turbulent mixing. This allows control of combustion at temperatures high enough to form initial release of the volatiles within the coal while keeping temperatures low enough to keep $NO_x$ emissions low as well. These conditions of staged air and turbulent mixing also provide a time and temperature condition which causes calcining of the sorbent during combustion. This permits adsorption of sulphur as it is being released from the coal while maintaining low $NO_x$ emissions. The relatively lower temperatures of combustion avoid deadburning of the sorbent (complete loss of chemical activity) or hardburning (partial loss of chemical activity).

The relatively lower temperatures of combustion are primarily achieved by means of a staged air combustion process. The process provides transport or primary, secondary, and tertiary or overfire air to be introduced to the fuel in controlled amounts, velocities and degree of turbulence at different points around the burner.

Any burner system can be utilized to provide the required combustion conditions for the invention process. Examples of such burners include among others: circular wall fired burners and tangential non-swirling interacting flame burners. Similarly, such burners can be used in conjunction with various types of furnaces to create the desired combustion conditions. Examples of these furnaces include, but are not limited to, wall fired, arch fired, corner fired, and slot fired. A burner which is preferred for use with the claimed process is also provided.

This preferred burner comprises a primary tube for fuel injection. A retractable oil gun aids ignition. The tube is provided with adjustable swirl vanes to provide swirl or turbulence to the primary air-fuel mix. Pulverized coal and sorbent are introduced to the primary tube along with pre-heated primary or transport air. Combustion of the coal-sorbent fuel mixture is initiated by means of an igniter. Preheated secondary air is introduced to the burner through one or two concentric annular secondary air ports which surround the primary tube.

The secondary air ports are provided with adjustable swirl vanes for purposes of adjusting the angle and degree of swirl or turbulence of the air as it issues from the secondary air ports. The advantage of the swirl vanes in the primary and secondary air streams is to control and stabilize the flame by means of controlling the air swirl and degree of mixing. They also act as a means to control temperature of combustion, as mentioned above.

Surrounding the fuel injector and the secondary air ports is a cone-shaped refractory quarl. On the perimeter of the quarl are located a plurality of outboard tertiary air ports which provide preheated air to the combustion zone. The tertiary air ports are also provided with means to adjust the angle and velocity of the air.

DESCRIPTION OF THE DRAWINGS

The invention will be more clearly understood through the description which follows, taken in conjunction with the accompanying drawings wherein.

DETAILED DESCRIPTION OF THE INVENTION

The process of the invention to reduce $NO_x$ and $SO_x$ emissions during the combustion of fossil fuels can be utilized in any burner or furnace which can provide the required combustion conditions. For example, circular wall fired burners, tangential non-swirling interacting flame burners and corner fired burners can be used among others. These can be used in conjunction with various types of furnaces, including, but not limited to, wall fired, arch fired, corner fired, and slot fired furnaces.

A preferred burner which has been used to create the required combustion conditions for the low $NO_x$ and $SO_x$ emissions process is described below.

Figure 5:
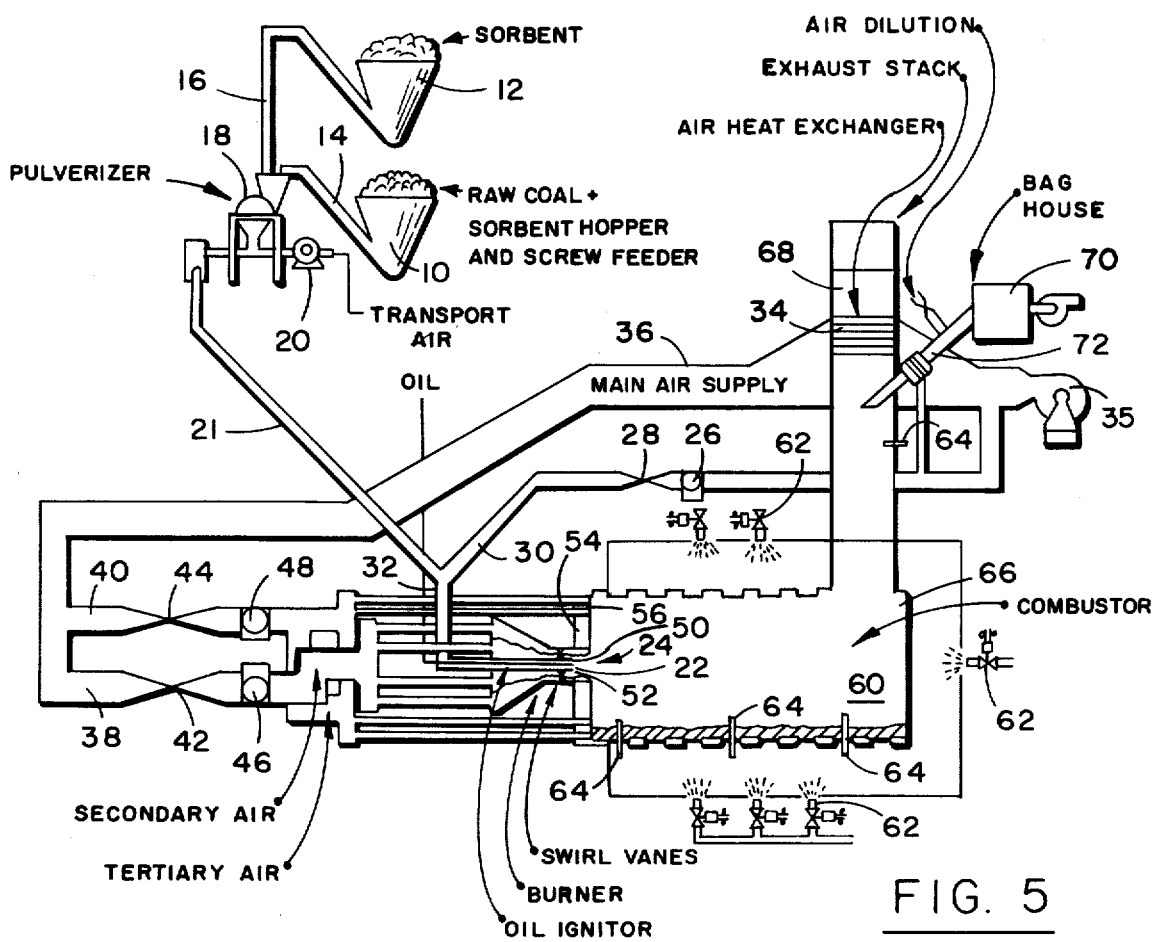
FIG. 5 shows a schematic representation of the low emissions burner system of the invention.

Referring now to FIG. 5, there can be seen a schematic representation of the process of the invention as utilized in the preferred low emissions burner of the invention. As shown, coal in a hopper 10 and sulphur sorbent in a hopper 12 are fed by means of screw feeders 14 and 16 respectively to a pulverizer 18. Here, the coal and sorbent are mixed together and pulverized followed by mixing with transport air or primary air from compressor 20. The primary or transport air, together with the pulverized coal and sorbent are transported pneumatically along conduit 21 to a primary tube 22 where the fuel is injected into the combustion zone. Oil is also provided to the primary tube 22 as well. Air flow control, as well as velocity control are achieved by means of flow control valve 26 and venturi meter 28 in conduit 30. Conduit 30 meets conduit 21 at conduit 32, which in turn terminates at the burner throat 24.

A primary air blower 35 provides a source of air for conduit 30 to be mixed with the primary or transport air and for the main air supply conduit 36. An air heat exchanger 34 heats air for supply to conduit 36 and to tees 38 and 40. Tees 38 and 40 supply secondary and tertiary air to the burner. In each instance the heated air passes through venturi meters 42 and 44 respectively, followed by passage through respective flow control valves 46 and 48. The secondary air issuing from valve 46 is then channeled into two concentric annular air ports 50 and 52 which surround the primary tube 22.

Surrounding the primary tube 22 is a refractory quarl 54. Good results have been achieved with a refractory quarl having an angle relative to its axial center which is in the range of about 25 degrees to about 35 degrees and a length to diameter ratio in the range of about 0.2 to about 1.

At the inner end of the quarl is the burner throat 24 where the primary tube 22 is located. Around the perimeter of the refractory quarl 54 are shown four outboard tertiary air ports 56. The number of tertiary air ports is preferably four and can range from about two to about sixteen. It is also preferable that the tertiary air ports be evenly spaced around the quarl. Heated air is supplied to the tertiary air ports 56 by means of conduit 40 as explained above.

An oil igniter 58 which is located in the center of the primary tube 22 provides ignition to the coal. The burner throat 24 and quarl 54 open into a furnace 60 which can be cooled by water sprays 62 and can contain sample probes 64. A view port 66 allows for observation of the flame during the combustion process.

Combusted material issues from the furnace 60 into the exhaust stack 68. Here, it can be directed to a bag house filter 70 through conduit 72 or issue out of the stack into the atmosphere. The heat exchanger 34 utilizes heat from the stack 68 to heat air for the secondary air ports 50 and 52 and tertiary air ports 56.

Figure 1:
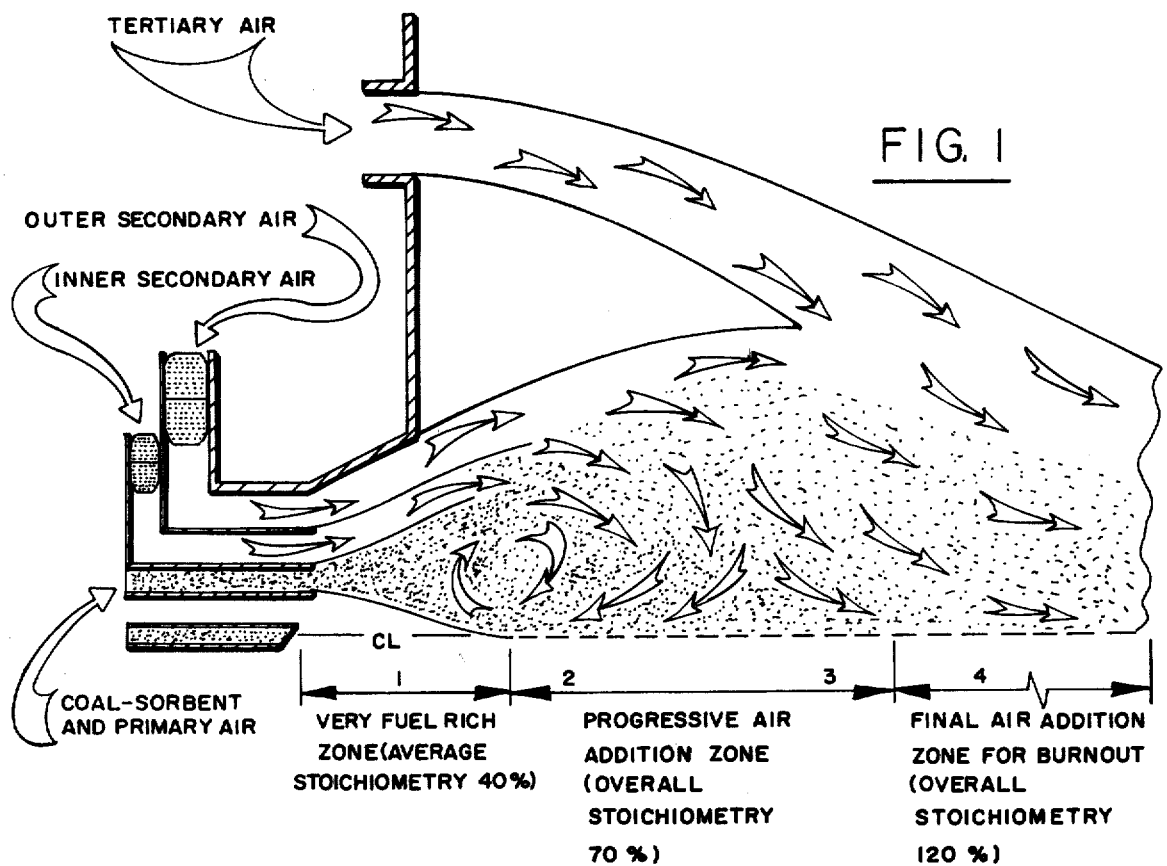
FIG. 1 shows a schematic representation of the air swirl pattern which is provided by the divided secondary throat burner of the invention.
Figure 2:
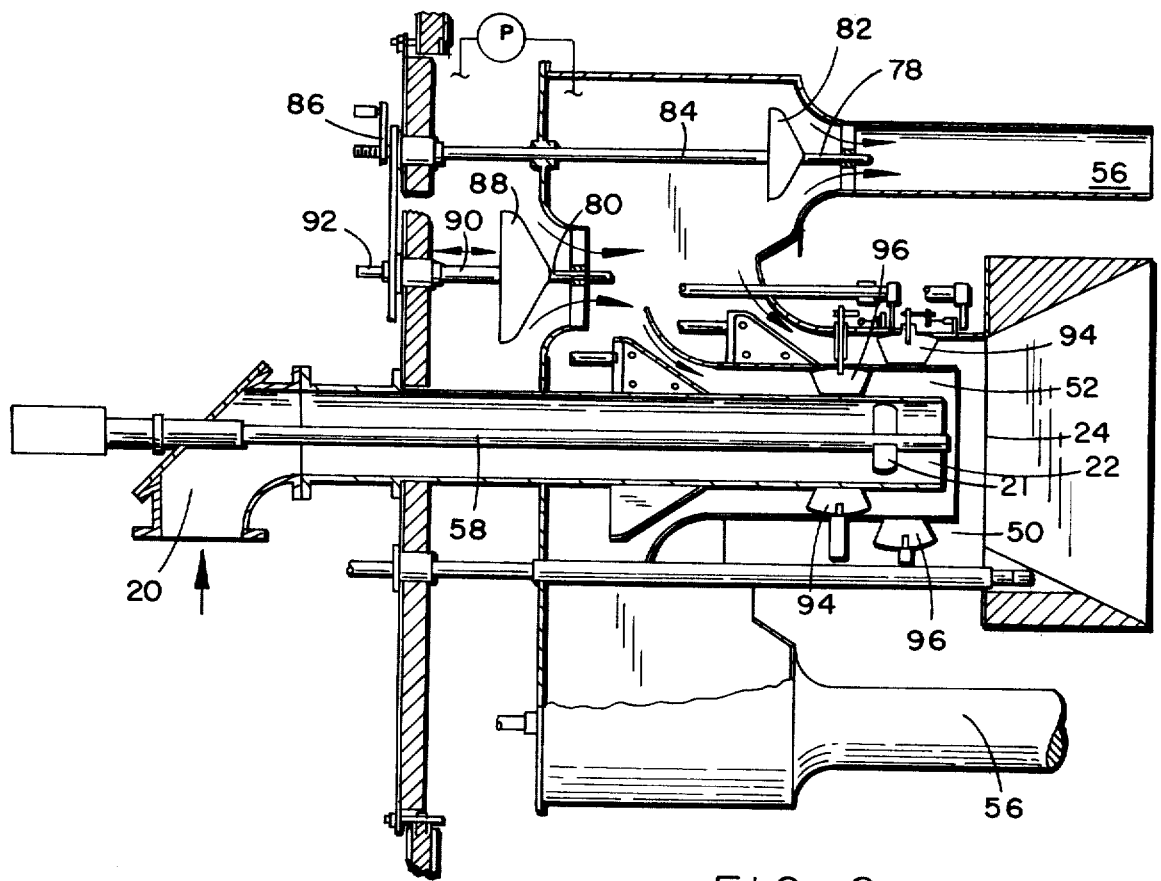
FIG. 2 shows a partially fragmented sectional view of the divided secondary throat burner of the invention.
Figure 6:
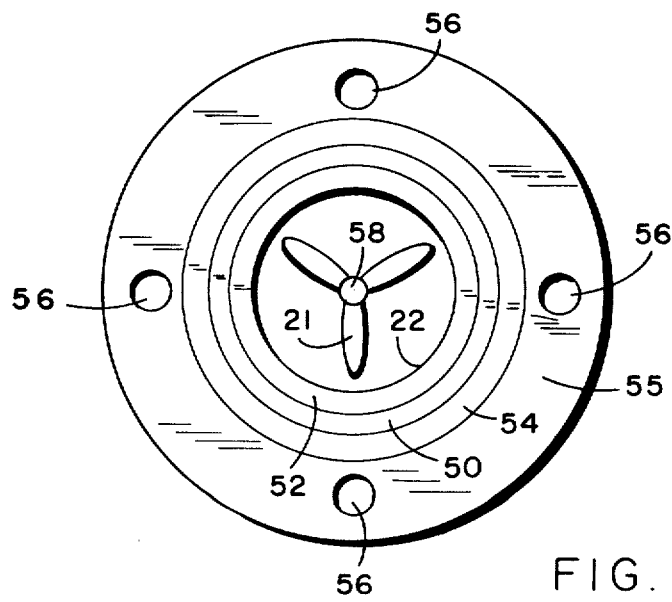
FIG. 6 shows a cross section across the face of the divided secondary throat burner showing the primary, secondary and tertiary air ports.

The divided secondary throat burner can be seen in greater detail in FIGS. 1, 2 and 6.

Referring now to FIG. 6, there is shown a view facing into the burner throat 24. As shown, the coal-sorbent and transport air issues from the primary tube 22 which has an oil gun 58 therein. Within the primary tube is an adjustable annular swirl vane 21 which divides the coalair stream into separate jets. Surrounding the primary tube 22 are two annular secondary air ports 50 and 52. Around the air ports 50 and 52 is a cone-shaped, high temperature refractory quarl 54. Surrounding the refractory quarl is an insulating block 55, in which are located four tertiary air ports 56. It can be seen from FIGS. 2 and 3 that the tertiary air ports 56 are located downstream from the burner throat 24.

The design of the burner provides a unique flame pattern to the fuel as it burns. By proper adjustment of the velocity and angle of the air issuing from the primary, secondary and tertiary air ports, a flame pattern similar to that shown in FIG. 1 can be achieved. Thus, just outside of the injector is a very fuel rich zone shown at 1. Here, coal burns in fuel rich conditions with the beginning evolution of sulphur and nitrogen. At the same time, the limestone is being calcined to produce calcium oxide.

With the progressive addition of air from the secondary air ports, we have an increasing amount of air at zones 2 and 3 as shown. In zone 2, more oxygen is provided. Sulphur evolved from the coal is captured by calcium oxide probably in the form of $H_2S$. Unreacted calcium oxide remains active during this stage. As more air is added in zone 3, more sulphur is evolved. The residence time in this zone is too short to cause deadburning of the calcium oxide. Conditions created in zone 2 favor production of $N_2$.

Finally, the air from the tertiary air ports provide excess air at zone 4. At this point the fuel burns out. Relatively low temperatures leave the calcium oxide sorbent still active. Such activity can be utilized in post-combustion treatment of flue gases, such as baghouses, spray driers and the like.

The arrows in the drawing indicate the general direction of turbulence created. The preferred flame pattern is of a medium swirl and usually has a somewhat rounded shape to it.

As mentioned above, the velocity and angle of the air issuing from the primary, secondary and tertiary air ports are important to the temperature and flame pattern which is created. Velocity is controlled primarily by means of air flow control valves in the air supply lines. Further control is made possible by air registers in the wind box. The air registers can be seen in FIG. 2 at 78 and 80. Register 78 controls air to the tertiary air port 56. The damper 82 is advanced to restrict air flow or withdrawn to increase air flow. This is made possible by means of rod 84 and crank arm 86. Register 80 operates similarly by advancing or withdrawing damper 88 by means of attached rod 90 and crank arm 92. Register 80 permits flow control of air entering secondary air ports 50 and 52, as well as tertiary air ports 56.

It is important to note that the primary tube 22 contains adjustable annular swirl vanes 21. One purpose of the swirl vanes is to stabilize the flame. The presence of the swirl vane in the primary tube divides the coal stream into separate jets. This creates some tangential momentum to the coal stream and increases mixing of the air and sorbent. Best results have been obtained with a swirl vane angle of about 30 degrees to about 50 degrees relative to the axial center of the primary tube.

Another important feature of the invention includes the provision of swirl vanes 94 and 96 within the annular secondary air ports 52 and 50 respectively. Movement of the swirl vanes 94 and 96 permits increase or decrease of velocity, as well as changes in the angle of swirl of the secondary air which issues from the air ports 50 and 52.

Figure 3:
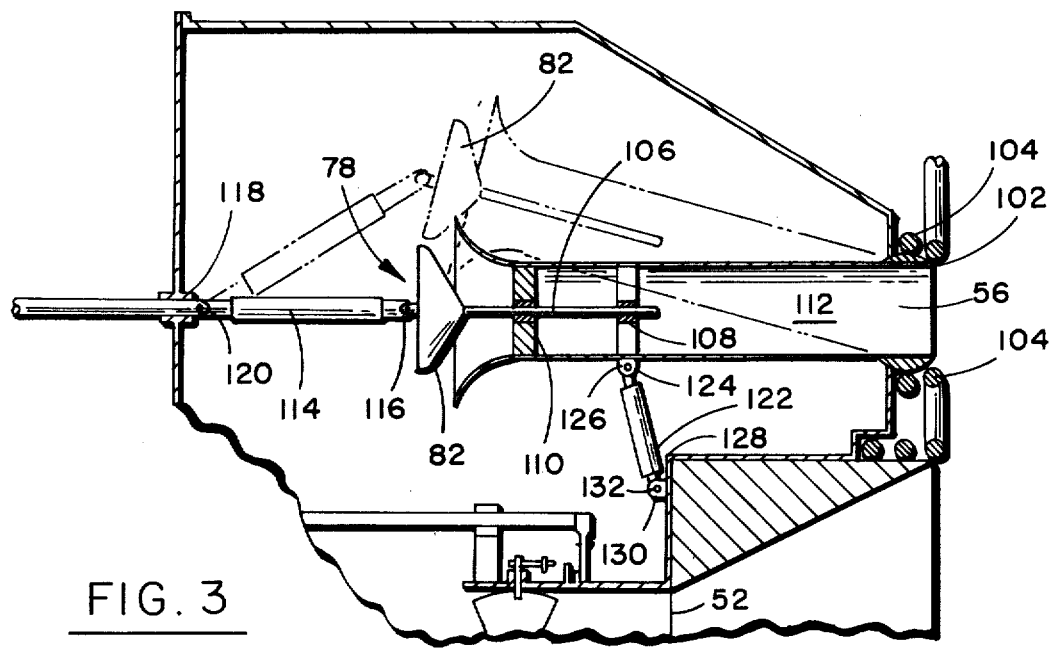
FIG. 3 shows a detailed fragmented sectional view of the means for controlling the angle of the air in the tertiary air ports.
Figure 4:
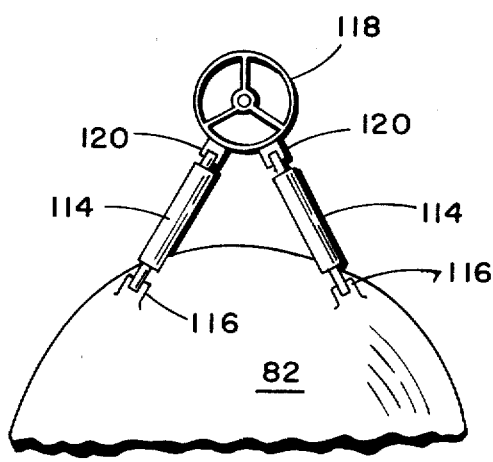
FIG. 4 shows an enlarged fragmented view of the gimbal joint of FIG. 3.

According to a preferred embodiment of the invention, the register 78 can be angularly adjusted to provide control of the angle of air issuing from the tertiary air ports 56. This can be seen in FIGS. 3 and 4. The tertiary air port 56, as shown in FIG. 3 is designed with a bulbous end section 102 which is journaled between ballbearings 104. This permits pivoting in the horizontal and vertical directions. At the same time, the damper 82 having an extension 106 is journaled in journal boxes 108 and 110 within the conduit 112. The damper 82 is attached to a guide sleeve 114 by means of universal joint 116 as shown in FIG. 4. The opposite end of the guide sleeve 114 is attached to a gimbal joint 118 by means of another universal joint 116 as shown in FIG. 4. The opposite end of the guide sleeve 114 is attached to a gimbal joint 118 by means of another universal joint 120. Another guide sleeve 122 is attached to conduit 112 by means of an extension 124 through which is passed a bolt 126. The opposite end of the guide sleeve 122 is attached to the housing 128 by means of an extension 130 through which is passed a bolt 132. This arrangement permits the raising and lowering of the conduit 112 which changes the angle of air issuing from tertiary port 56.

The swirl vanes then, within the primary tube and secondary air ports, as well as the adjustable angle of the tertiary air ports 56 provide a means for variation of the angle of air issuing from the primary, secondary and tertiary air ports. In addition, means are provided for controlling the degree of swirl and turbulence resulting therefrom. The swirl vanes in the primary tube combined with swirl vanes in each of the dual annular secondary air ports and provision of tertiary air ports provide this preferred burner with the ability to very finely tune the shape and pattern of the flame front. This is important in achieving the desired temperature of burn for purposes of reducing the production of $NO_x$ and $SO_x$ emissions.

Figure 7:
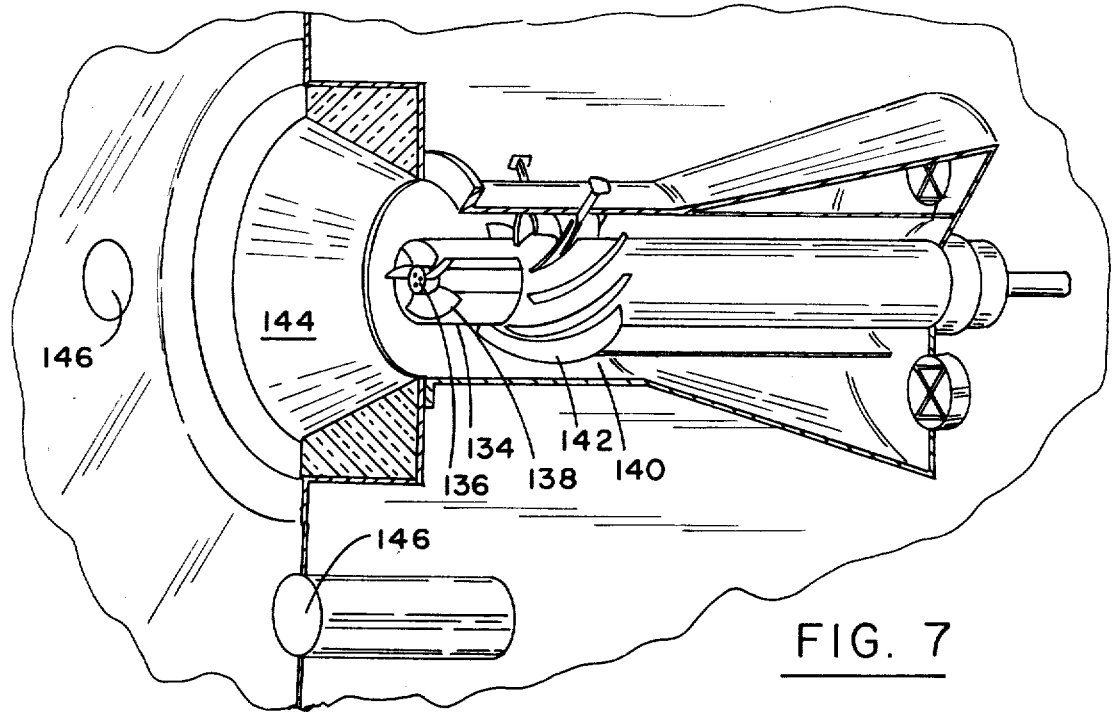
FIG. 7 shows a partially broken away view of the double concentric burner of the invention.

Another embodiment of the burner of the invention combines most of the same features as the preferred divided secondary throat burner. The difference lies in the presence of a single secondary air port as compared with the double annular secondary air ports. This burner, referred to as the "double concentric burner", is shown in FIG. 7.

The burner includes a primary tube 134 which contains a fuel injector 136 and swirl vanes 138. Surrounding the primary tube 134 is a single annular secondary air port 140 which contains adjustable swirl vanes 142. The primary tube 134 and secondary air port 140 open onto a refractory quarl 144. Around the periphery of the refractory quarl 144 are disposed four tertiary air ports 146, only three of which are shown.

With the exception of the single secondary air port, this double concentric burner combines the same features as the dual throat burner. The dual throat burner is preferred in the invention process over the double concentric burner because the dual secondary air streams permit greater variation and adjustment of air flow in terms of angle, velocity, and stoichiometry.

The process for reducing $NO_x$ and $SO_x$ emissions which can be utilized in any burner and furnace which provides the required combustion conditions, will next be discussed. The first step according to the process of the invention involves mixing together a sorbent and a fossil fuel, such as oil or coal. The process is described specifically for the use of coal.

The sulphur sorbent is referred to herein and in the appended claims simply by the word "sorbent". It is a mineral or compound which will adsorb sulphur or sulphur compounds produced under the fuel combustion conditions. Generally the sorbent is comprised of alkali and alkaline earth metal carbonates, bicarbonates, and oxides. Examples of such materials include aragonite, calcite, vaterite, and limestone, which are mainly composed of calcium carbonate. Other materials which can be used include trona and nahcolite which are mainly sodium bicarbonate; magnesite, which is magnesium carbonate; potassium carbonate, and dolomite, which is calcium magnesium carbonate. Mixtures of the above can also be used.

The amount of the sorbent to be used with the coal depends on the sulphur content of the coal. This can only be determined by analyzing the type of coal which is being used. After the percent sulphur contained in the coal is determined, the required stoichiometric ratio of the alkali or alkaline earth metal contained in the sorbent can then be determined.

It has been found that a stoichiometric ratio of alkali or alkaline earth metal in the sorbent to sulphur contained in the coal should be at least 1. Best results have been achieved using a stoichiometric ratio of metal in the sorbent to sulphur contained in the coal, which is found in the range of between one and seven. When limestone was used in a calcium to sulphur stoichiometric ratio of 1, $SO_2$ reduction was 50%. A stoichiometric ratio of 2 gave 75% reduction and a stoichiometric ratio of 3 gave 85% reduction of $SO_2$.

While absolute purity of the sorbent is not essential a fairly pure material is desirable. The results generally will be consistent with the amount of the mineral which is being used. Substantial variations in purity then, would give substantial variations in the results.

Experiments have shown that the use of precalcined sorbents of the types defined above have not given good results. For this reason, the process as disclosed and claimed herein consists of a process which calcines the sorbent material during the combustion process. It is felt that this process contributes to the lowered sulphur dioxide as well as lowered nitrogen oxide emissions.

It has been found that the temperature of calcination of the sorbent material is important to the ability of the sorbent to remain chemically active during combustion. This is important so that the sulphur can be adsorbed. If calcination takes place at a very high temperature, for example, at a temperature which is greater than 3000 degrees F. for a time which is sufficient to produce a very high temperature in the sorbent material, then the sorbent will experience dead burning. When dead burning occurs, the sorbent experiences a major change in its chemical characteristics, which renders it almost chemically inert. Physically, the sorbent particle diameter is significantly reduced with a complete loss of pores. As a consequence, the specific surface available for adsorption of a monolayer of gas is reduced to the apparent surface area of the particle. Dead burning is a function, as mentioned above, of high temperature and time at that temperature.

When the sorbent is calcined at an intermediate temperature, for example in the range of approximately 1900 degrees F. to about 2700 degrees F. for a sufficient time, hard burning can occur. Hard burning can be defined as a condition of the calcined sorbent wherein the chemical characteristics are only partially changed. Pore size is increased, as well as the volume of the pore size. Depending upon the time at the hard burning temperature, there can be a change in the particle diameter. The surface active area for adsorption of a monolayer of gas is somewhat greater than the apparent surface area of the particle. Overall reactivity will depend upon the time at the hard burning temperature.

The above conditions of dead burning and hard burning are generally termed overburning. Most desirably, the sorbent is calcined to a soft burn stage.

When soft burning occurs, usually at a temperature of about 1400 degrees to about 1900 degrees F. for a sufficient time, pore size is increased and the ability of the particles to adsorb a monolayer of gas is significantly increased. Reactivity of the particle is maintained and the relative pore size distribution is also maintained. This last condition is the desired one and is the object of the calcining process during combustion, which forms a major object of this invention.

Since the time at the particular calcination temperature is of importance, it can be appreciated that higher temperatures can be tolerated if the residence time of the particle at that temperature is relatively small. To avoid overburning, then, the residence time at high temperature can be decreased, the temperature can be decreased, or both the temperature and the residence time can be decreased.

The process of the invention by utilizing the staged air process, as well as the control of swirl, angle, and velocity of air makes the ideal calcination temperature possible.

Additional temperature control can be achieved through recirculation of flue gas through secondary and tertiary air ports. Water or steam injection through any of the air streams can also be resorted to. If desired, a water slurry of the sorbent can be introduced to the coal in proximity to the primary tube exit. By introducing a water slurry of the sorbent through the secondary and tertiary streams, further temperature control can also be achieved.

The initial particle size of the sorbent material has also been found to affect the ability of the sorbent to reduce the sulphur emissions.

The average particle size of the sorbent is preferably less than about seventy-five microns in diameter. Most preferably, the sorbent has an average particle size in the range of about ten to about twenty-five microns.

According to the preferred method of the invention, the pre-pulverized sorbent material is mixed with the unpulverized coal, followed by pulverizing of the mixture. The final size of the coal is preferably pulverized to a size such that seventy percent of the particles will pass through a two hundred mesh screen.

Alternately, unpulverized sorbent material and unpulverized coal can be mixed together and then pulverized together. Water or other processing aid can be added to facilitate pulverizing if desired. Finally, pre-pulverized sorbent material and pre-pulverized coal can be mixed together and used. This last method has not been found to produce the good results of the other two described methods. This is felt to be due to the fact that thorough mixing of the two materials has not been achieved by current methods.

Following pulverizing of the sorbent-coal mixture, it is next mixed with pre-heated primary air. The amount of the air to be used comprises about 10% to about 30% of the stoichiometric air required to combust the coal. The lower figures are preferred while the higher figures are used for low heat coals. For example, using a coal providing above 11,000 B.T.U./lb., and 1.5-2 lbs. mill air per lb. of coal, gives an amount of air lying in the above ranges. The temperature of the air is preferably in the range of about 150 degrees F. to about 160 degrees F. Higher temperatures than this could cause ignition during transport. The velocity of the air is preferably in the range of about 30 f.p.s. to about 100 f.p.s.

Transporting the resulting air-coal-sorbent mixture to the primary tube forces it to pass through the swirl vanes in the primary tube. As mentioned previously, this divides the coal-sorbent-air stream into separate jets to improve mixing by providing some tangential momentum. The net effect is to stabilize the flame. Best results have been achieved with the primary tube swirl vanes adjusted to provide an angle relative to the axial center of the tube of about 30 degrees to about 50 degrees.

Upon ignition, pre-heated air is provided to the secondary air ports in amounts ranging from about 40% to about 100% of the stoichiometric amount of the required air to combust the coal. The secondary air is preferably heated to a temperature in the range of about 400 degrees F. to about 750 degrees F. The velocity of the air is preferably in the range of about 30 f.p.s. to about 100 f.p.s.

In addition, good results have been achieved with the secondary air wherein the swirl vanes are adjusted to provide an angle relative to the axial center of the quarl of about 45 degrees to about 70 degrees.

The amount of the primary air and secondary air taken together, preferably amounts to a figure in the range of about 50% to about 80% of the stoichiometric air required to combust the coal. The exact amount of air depends on the type of coal used.

Pre-heated air is provided to the tertiary air ports in amounts equal to the balance of the stoichiometric amount of air required to combust the coal, plus an excess of about 25% to about 40%. The velocity of the tertiary air is preferably in the range of about 30 f.p.s. to about 100 f.p.s. The temperature of the tertiary air is preferably in the range of about 400 degrees F. to about 750 degrees F.

When the above mentioned air is provided to the secondary air ports, the swirl vanes within the secondary air ports are adjusted to provide a medium swirl pattern to the flame. This adjustment has been found to provide the best results for lowering the $SO_x$ and $NO_x$ emissions.

It is believed that the process causes the coal and sorbent particles to be initially rapidly heated. This results in devolatilization of the coal particles producing sulphur, nitrogen, and other gaseous reaction products. At the same time the sorbent is being rapidly heated, it also begins to be calcined. Sulphur in the form of sulphur dioxide or possibly hydrogen sulphide, together with oxygen, diffuses into the sorbent particles. It is believed that the outer surface of the sorbent is filled first with the sulphur gases. When the outer surface of the particle has been reacted, the process of sorption must proceed toward the interior of the particle. Thus, we have a condition where the calcination is occurring at the same time that the sulphur products from the coal are circulating in the same vicinity. As mentioned previously, it is important to prevent too rapid heating so that the pores within the particles will not be blocked. This would prevent the sulphur sorption by the sorbent particle.

As the combustion process continues and the sorbent and coal particles and ash are passed through the furnace to the stack, the particle temperature drops, retaining a residual sorption reactivity. This reactivity can be utilized to adsorb sulphur which remains in the gases. In addition, the presence of such reactive particles in a postcombustion filtering device, such as a bag house or spray drier can enhance sulphur capture.

Following the above process utilizing the divided secondary throat burner and using a low sulphur Utah coal, with three different sorbents, including limestone, trona, and sodium-bicarbonate in calcium or sodium to sulphur in the coal stoichiometric ratios ranging between 1 and 3, the sulphur dioxide emissions were significantly reduced.

The coal which was used was found to have, by proximate analysis, the following characteristics:

TABLE I

| UTAH COAL COMPOSITION | |
|---|---|
| Proximate Analysis, % | |
| (as received) | |
| Moisture | 6.39 |
| Volatile | 38.89 |
| Ash | 7.4 |
| Fixed Carbon | 47.32 |
| Heating Value, Btu/lb | 12,340 |
| Ultimate Analysis, % (DAF) | |
| Carbon | 79.45 |
| Hydrogen | 6.03 |
| Nitrogen | 1.44 |
| Sulphur | 0.74 |
| Oxygen (by difference) | 12.34 |

The reduction of sulphur emissions as a measure of the type of sorbent used is shown in Table II below.

TABLE II

| SUMMARY OF RESULTS | | | | | |
|---|---|---|---|---|---|
| | | % Reduction of $SO_2$ Stoichiometric Ratio | | | |
| Coal | Sorbent | Ca/ S = 1 | Ca/ S = 2 | Ca/ S = 3 | Na/ S = 1 | Na/ S = 2 |
| Utah (low Sulpur) | Limestone | 53 | 73 | 88 | | |
| | Trona | | | | 41 | 80 |
| | Sodium Bi-carbonate | | | | 52 | |

As can be seen from Table II, the best results were obtained using sorbents which contained a high metal to sulphur stoichiometric ratio. For this reason, the higher stoichiometric ratios are preferred. Limestone gave the best results and for this reason it is the preferred sorbent for use in the invention process.

Utah coal was combusted in the double concentric burner using between 1% and 10% excess air and the $NO_x$ and $SO_x$ emission levels were measured. In order to demonstrate the effects of the invention process, the coal alone was combusted first without the sorbent and without air staging. Next, the coal alone was combusted under staged conditions. Pulverized limestone was added to the coal prior to pulverizing in a Ca/S ratio of 1 and combusted under unstaged air conditions. Finally, the same coal-limestone mixture was combusted under staged air conditions following the invention process.

Figure 8:
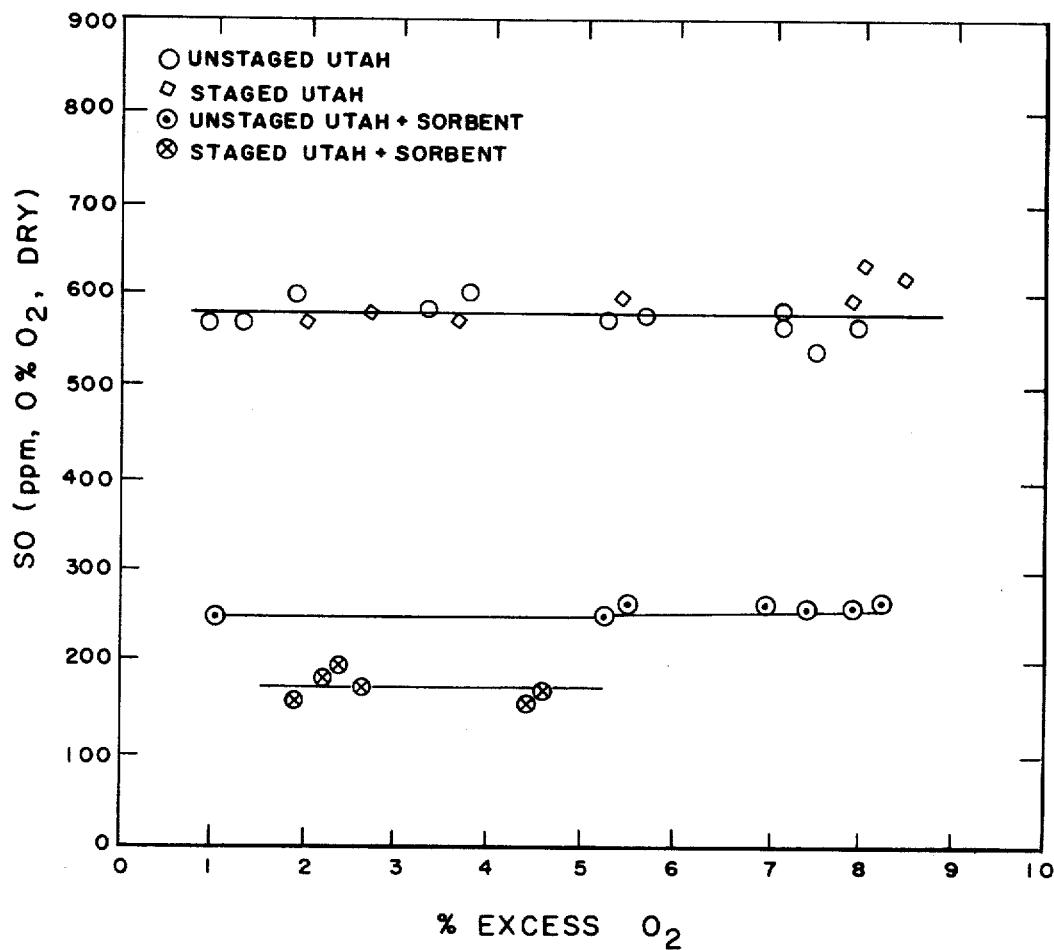
FIG. 8 is a graph which shows the effect of the invention process on $SO_x$ emissions; and, FIG. 9 is a graph which shows the effect of the invention process on $NO_x$ emissions.
Figure 9:
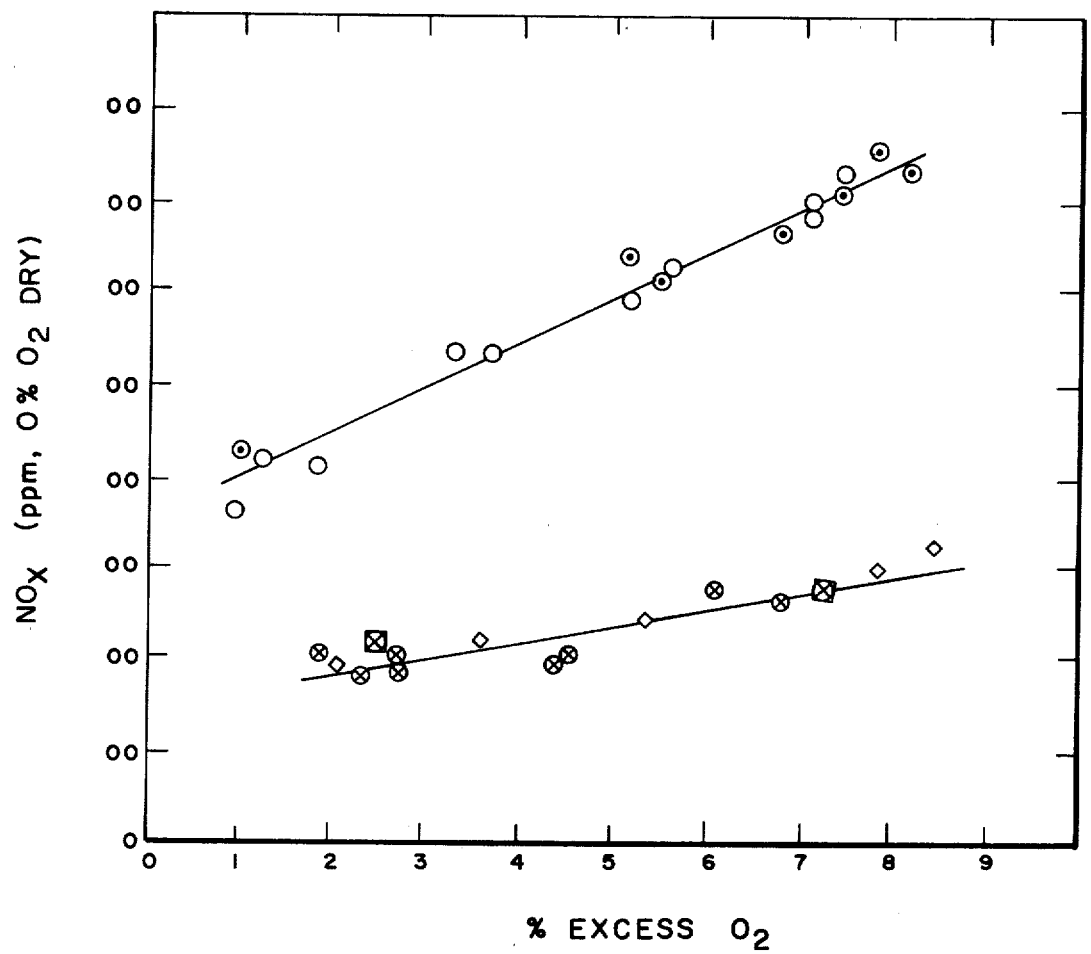

The results of these tests can be seen in the graphs shown in FIGS. 8 and 9. FIG. 8 shows $SO_x$ emissions and FIG. 9 shows $NO_x$ emissions. It is apparent from FIG. 8 that the invention process significantly reduces $SO_x$ emissions. Excess $O_2$ does not appear to increase $SO_x$ emissions. At the same time, the invention process utilizing the sorbent and staged air conditions produces reduced $NO_x$ emissions as compared with unstaged air conditions with or without the addition of the sorbent, as shown in FIG. 9. Excess air appears to increase $NO_x$ levels under all combustion conditions used. In order to establish reproducible $SO_x$ values, the final $NO_x$ test included combustion of the coal alone after the coal-sorbent figures were obtained. It can also be seen from the graph that $NO_x$ emission increased in all cases with an increase in the amount of excess $O_2$.

The process as disclosed above comprises the reduction of $NO_x$ and $SO_x$ emissions from coal combustion using a process which utilizes a sorbent to adsorb the sulphur and a staged air process which keeps the peak combustion temperatures relatively low compared to state of the art processes. Thus, the sorbent which is preferably pre-pulverized is mixed with the coal and pulverized together with it. Combustion of the coal-sorbent mixture is achieved in such a way that the combustion air is supplied in a staged manner such that the primary and secondary air is supplied in amounts which are less than the stoichiometric amount which would be required to combust the coal. Tertiary air is supplied in an amount which supplies the balance of the stoichiometric air in addition to about 25% to about 40% excess of air.

Any residual reactivity retained by the calcined sorbent can be used downstream of the combustion zone to improve sulphur capture by post-combustion filtering devices as a baghouse filter or spray drier.

The above described process can be used in any burner or furnace which can provide the required combustion conditions. Using the preferred burner as described provides primary or transport air with the coal through the primary tube. Secondary air is provided to the flame by means of one or two concentric or annular air streams which surround the primary air stream. Adjustable swirl vanes in the primary and secondary air streams provide for variable independent swirl therein. Tertiary air is provided to the flame by means of preferably four to eight outboard air ports which are located around the perimeter of the burner. The tertiary air ports are also capable of variation as to angle. The resulting process of burning or combustion of the coal takes place under conditions which favor calcination of the sorbent during the combustion process at temperatures and under conditions which also favor low $NO_x$ production.

Various modifications of the invention are contemplated and can be resorted to by those skilled in the art without departing from the spirit and scope of the claims of the invention as defined by the following claims.

We claim:

1. A process for reducing the sulpher and nitrogen emissions during coal combustion comprising:

mixing together an uncalcined sorbent selected from the group consisting of alkaline and alkaline earth metal carbonates, bicarbonates, oxides and mixtures thereof and coal;

pulverizing said coal-sorbent mixture prior to combustion whereby the average particle size of said coal-sorbent mixture does not exceed 75 microns, mixing said sorbent and coal in proportions to provide a metal in the sorbent to sulphur in the coal stoichiometric ratio of at least 1, combusting said mixture under staged air conditions to provide favorable sorbent calcining conditions and to favor low $NO_x$ emissions by control of combustion temperature and coal-air stoichiometry, wherein said staged air conditions comprise primary, secondary, and tertiary air streams wherein said primary air stream provides between about 10% to about 30% of the stoichiometric air required to combust the coal, said secondary air stream provides about 40% to about 100% of the stoichiometric air required to combust the coal, said tertiary air supplies the balance of the stoichiometric air required to combust the coal, plus an excess of between about 25% to about 40%, controlling said combustion air whereby said primary air is preheated to a temperature in the range of about 150 degrees F. to about 160 degrees F., said secondary and tertiary air streams are preheated to a temperature in the range of about 400 degrees F. to about 750 degrees F.; and, combusting said mixture to simultaneously burn said fuel and calcine said sorbent so that sulphur being evolved from the fuel during the combustion process will be adsorbed by said calcined sorbent.

2. A process as claimed in claim 1 wherein:
said sorbent is pre-pulverized prior to mixing with said coal.

3. A process as claimed in claim 1 wherein:
said metal in the sorbent to sulphur in the coal stoichiometric ratio is in the range of about 1 to about 7.

4. A process as claimed in claim 1 further comprising:
swirling said primary and secondary air streams.

5. A process as claimed in claim 4 further comprising:
swirling said tertiary air streams and wherein all of said air streams have a velocity in the range of about 30 f.p.s. to about 100 f.p.s.

6. A process as claimed in claim 5 wherein:
the total amount of primary and secondary air is equivalent to approximately 50% to 80% of the stoichiometric air which is required to react with the coal.

7. A process as claimed in claim 1 further comprising:
further controlling combustion temperature through recirculation of flue gas.

8. A process as claimed in claim 1 further comprising:
further controlling combustion temperature through the injection of water into the combustion zone.

9. A process as claimed in claim 1 further comprising:
further controlling combustion temperature through injection of a water slurry of the sorbent into the combustion zone.

10. A process as claimed in claim 1 further comprising:
utilizing any residual sorbent reactivity to enhance the sulphur capture efficiency of post-combustion process steam treatment apparatus.